United States Patent

Noda

[11] Patent Number: 5,774,495
[45] Date of Patent: Jun. 30, 1998

[54] COMMUNICATION APPARATUS

[75] Inventor: Mitsuhiko Noda, Kyoto, Japan

[73] Assignee: Rohm Co., Ltd., Kyoto, Japan

[21] Appl. No.: 619,169

[22] Filed: Mar. 21, 1996

[30] Foreign Application Priority Data

Mar. 24, 1995 [JP] Japan .................................... 7-065365

[51] Int. Cl.$^6$ ...................................................... H04B 1/38
[52] U.S. Cl. .......................... 375/222; 375/340; 375/354
[58] Field of Search .................................. 375/340, 354, 375/371, 372, 222

[56] References Cited

U.S. PATENT DOCUMENTS 5,379,299  1/1995  Schwartz ................................. 375/371

Primary Examiner—Stephen Chin
Assistant Examiner—Kevin Kim
Attorney, Agent, or Firm—Nikaido, Marmelstein, Murray & Oram LLP

[57] ABSTRACT

Operation delay time of a demodulator is counted and outputted as a count value by a counting circuit. The count value is compared by a comparator with an output value of a counter which starts counting by being triggered by a synchronizing signal outputted by a timing generating circuit. The timing of the processing is delayed by a time corresponding to the operation delay time by a delay circuit provided in a codec circuit. Substantially the same processing is performed on the transmitting side.

2 Claims, 4 Drawing Sheets

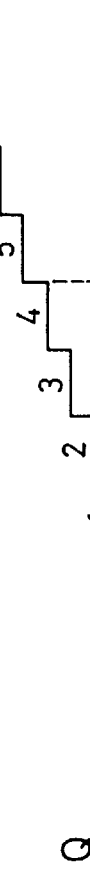

Fig. 4

| START SYMBOL | PREAMBLE | UNIQUE WORD | CI | DATA | CRC |

COMMUNICATION APPARATUS

BACKGROUND OF THE INVENTION

1. Field of the Invention

The present invention relates to a communication apparatus, and more particularly, to a communication apparatus for use in a personal handy phone system (hereinafter, referred to as "PHS").

2. Description of the Prior Art

In recent years, portable telephones originating from car phones have been acceleratingly popularized with the introduction of the PHS and the cost of such portable telephones has been remarkably decreased. In such a market trend, various attempts have been made for cost reduction. The structure of a conventional circuit for codec (disassembly and assembly of communication packets) of a communication apparatus such as the PHS will be shown below.

FIG. 1 is a block diagram showing the structure of a conventional communication apparatus. Reference numeral 1 represents a receiving antenna. Reference numeral 2 represents a demodulator. Reference numeral 5 represents a codec circuit. Reference numeral 6 represents a transmitting antenna. Reference numeral 7 represents a modulator. Reference numeral 11 represents a timing generating circuit. Reference numeral 30 represents a first memory circuit. Reference numeral 31 represents a second memory circuit. Hereinafter, an operation of the conventional communication apparatus thus structured will be described.

First, an operation performed on the receiving side will be described. Sound data received by the receiving antenna 1 is demodulated to sound signals by the demodulator 2. At this time, channel codec is performed by the codec circuit 5 for each communication packet. Since the demodulation cannot be performed in an instant, some delay time is generated. However, it is a synchronizing signal SSYNC output by the timing generating circuit 11 that decides the timing of the demodulation.

For this reason, a malfunction can occur in the channel codec if a delay time ΔT is generated between the reception of the radio wave and the output of the demodulator 2. Therefore, the operation delay time of the demodulator 2 is stored in the first memory circuit 30 so that the phase of output of the demodulator 2 is delayed by the operation delay time ΔT by a delay circuit 5a provided in the codec circuit 5.

On the transmitting side, an operation delay time is also generated in the operation of the modulator 7 and it is necessary to shift the phase of output of the modulator 7 to precede the phase of the synchronizing signal SSYNC output by the timing generating circuit 11. To do so, the operation delay time of the modulator 7 is stored in the second memory circuit 31 and the operation delay time is compensated for by a leading circuit 5b so that the output of the modulator 7 is in synchronism with the signal SSYNC.

However, the conventional communication apparatus is defective since it is necessary to previously determine the operation delay times of the modulator 7 and the demodulator 2 to store them in the first memory circuit 30 and the second memory circuit 31 as numerical data. As the first memory circuit 30 and the second memory circuit 31, electrically erasable programmable read only memories (EEPROMs) are used, and the use of such memories leads to an increase in mounting area and cost. Therefore, it is necessary to rewrite the EEPROM every time the specifications of the demodulator 7 and the modulator 2 are changed in the stage of prototype manufacture or mass production.

SUMMARY OF THE INVENTION

An object of the present invention is to provide a communication apparatus capable of automatically adapting to changes of specifications of the modulator and the demodulator.

To achieve the above-mentioned object, a communication apparatus of the present invention is provided with: modulating and demodulating means for modulating and demodulating sound information to be transmitted and received; counting means for counting a processing time of the modulating and demodulating means; and adjusting means for adjusting a timing for codec according to an output of the counting means.

BRIEF DESCRIPTION OF THE DRAWINGS

This and other objects and features of this invention will become clear from the following description, taken in conjunction with the preferred embodiments with reference to the accompanied drawings in which:

FIG. 3 shows operation waveforms of a principal portion of the embodiment; and

FIG. 4 shows a packet of a signal to be transmitted and received.

DESCRIPTION OF THE PREFERRED EMBODIMENTS

Hereinafter, a communication apparatus according to the present invention will be described with reference to the drawings.

Figure 1:
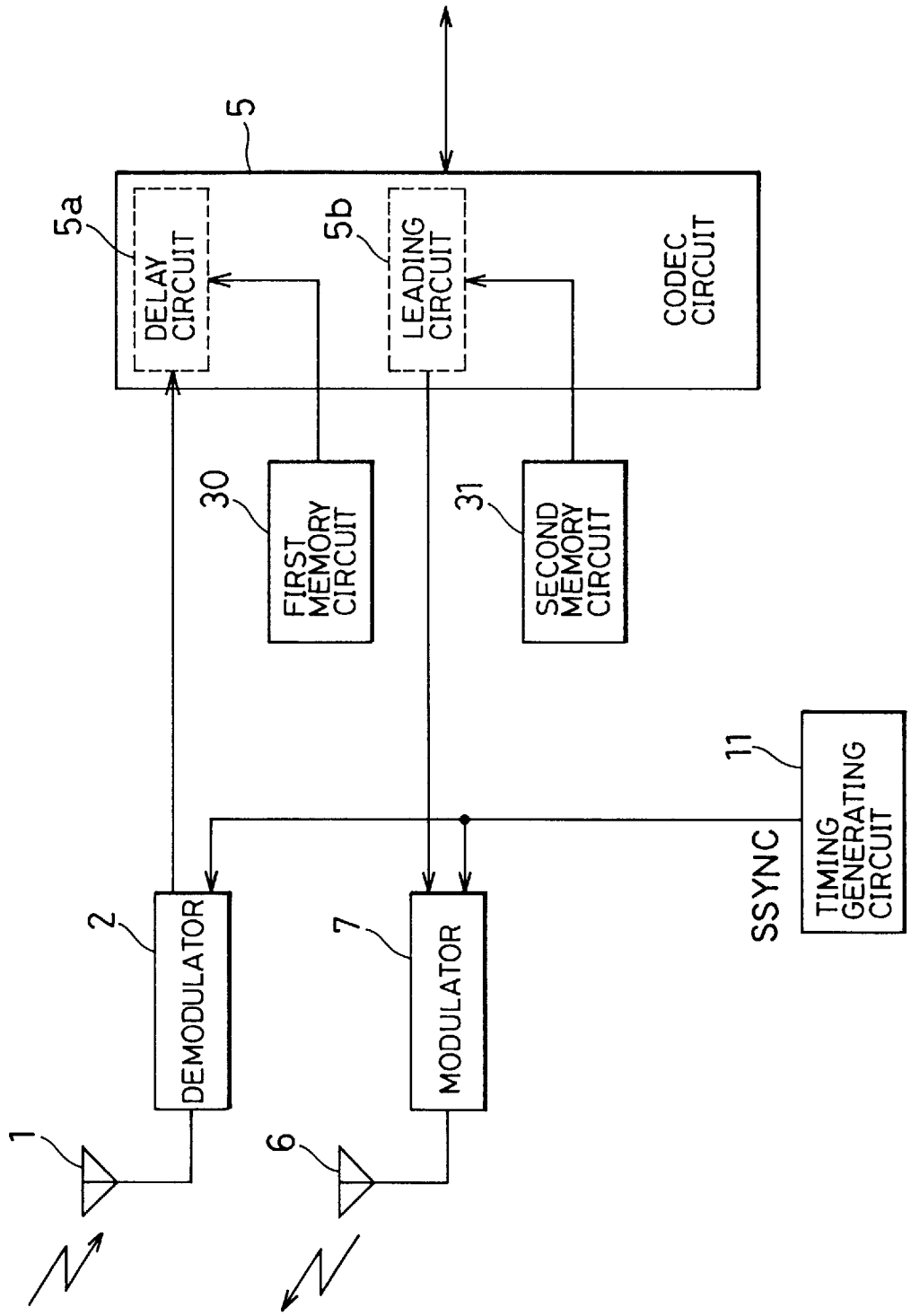
FIG. 1 is a block diagram showing the structure of the conventional communication apparatus.
Figure 2:
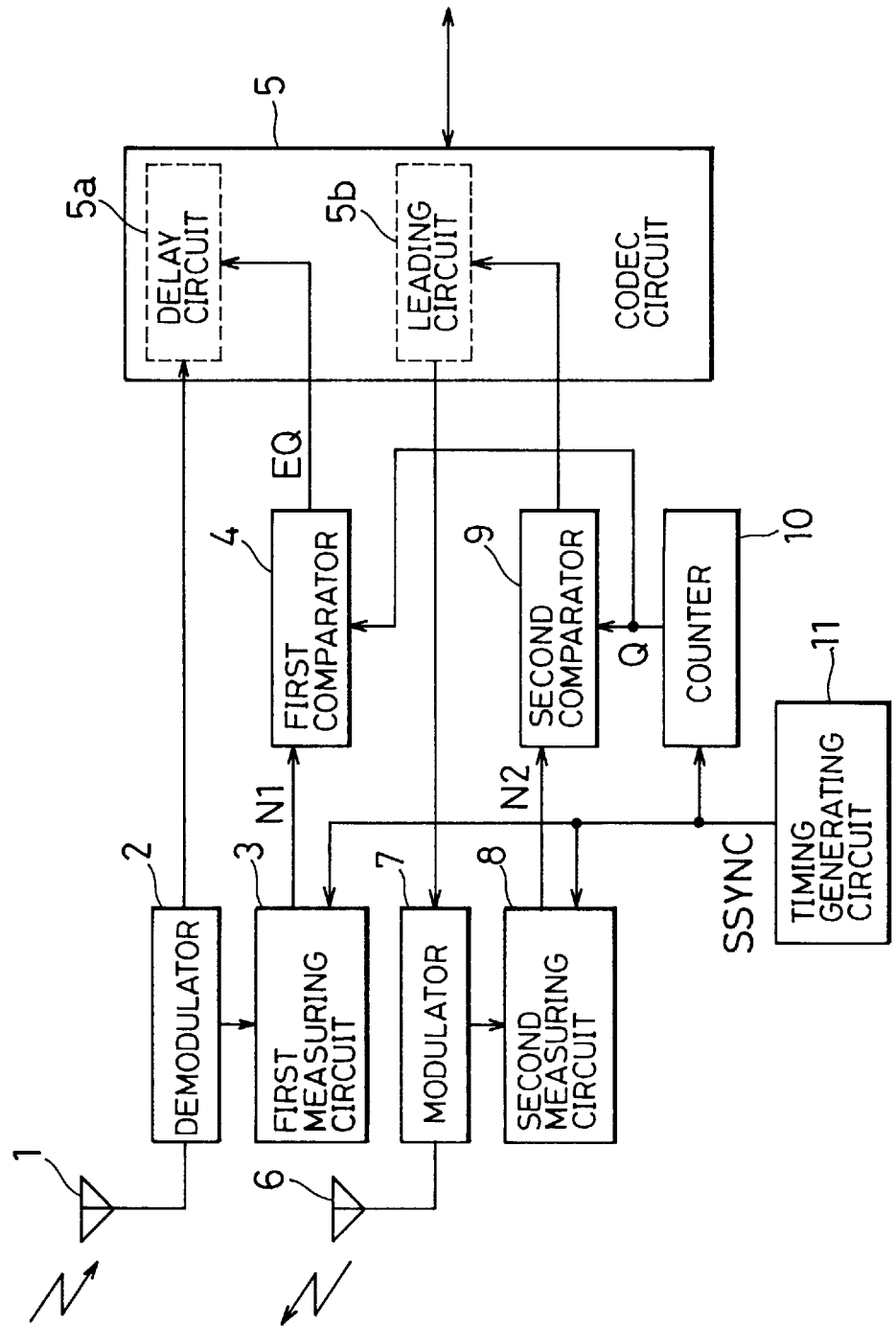
FIG. 2 is a block diagram showing the structure of an embodiment of a communication apparatus according to the present invention.

FIG. 4 shows a communication packet. The packet comprises a start symbol representative of the start of a data enumeration, a preamble for frame synchronization, a unique word for bit synchronization, a CI indicating what kind of data is being transmitted, main data (in this case, sound data), and an error detecting code CRC. FIG. 2 shows the structure of a cell (here, referred to as parent apparatus) of a base station of the PHS. In this figure, reference numeral 1 represents a receiving antenna and reference numeral 2 represents a demodulator. The packet of FIG. 4 is transmitted on a high-frequency carrier. The packet is extracted from the high-frequency signal by the demodulator 2. The packet output from the demodulator is transmitted to the codec circuit 5.

The receiving antenna 1, the demodulator 2, the codec circuit 5, the transmitting antenna 6, the modulator 7 and the timing generating circuit 11 are the same as those of the conventional communication apparatus and will not be described. Reference numeral 3 represents a first measuring circuit. Reference numeral 4 represents a first comparator. Reference numeral 8 represents a second measuring circuit. Reference numeral 9 represents a second comparator. Reference numeral 10 represents a counter. An operation of the communication apparatus thus structured will be described.

The time required for the processing in the demodulator 2 is counted by the first measuring circuit 3. The demodulator 2 demodulates received signals at all times. The demodulated signals are, as described above, supplied to the codec circuit 5 and to the first measuring circuit 3. The measuring circuit 3 is supplied with the synchronizing signal SSYNC shown in FIG. 3 from the timing generating circuit 11 and starts counting according to a pulse, e.g. P1 of the synchronizing signal SSYNC. The counting is performed by counting the clock by the counter provided in the measuring circuit. When the start symbol of the demodulated packet is supplied from the demodulator 2, the counting is stopped. While the counting is stopped, the output (count value N1) is supplied to the first comparator 4.

The counter 10 starts counting by use of a clock of the same frequency by being triggered by the synchronizing signal SSYNC (in this case, by the pulse P1) to obtain a count value Q as shown in (b) of FIG. 3. The first comparator 4 compares the count value Q with the count value N output by the first measuring circuit 3 and when the count value Q becomes higher than the count value N1, the first comparator 4 outputs a signal EQ shown in (c) of FIG. 2. The signal EQ is transmitted to the delay circuit 5a provided in the codec circuit 5 to start the codec of reception data delayed as shown in (d) of FIG. 3.

In transmission, the second measuring circuit 8 and the counter 10 start counting respectively in response to a pulse P1 of the reference timing signal. The operation delay time of the modulator 7 is determined by the second measuring circuit 8 in a like manner to output a count value N2. The count value N2 is transmitted to the second comparator 9 which compares the count value N2 with the count value Q output by the counter 10. Then, the same processing as that shown in FIG. 3 is performed by the leading circuit 5b. As a result, leading operation is started in the circuit 5b. When a reception period is completed, a transmission period is commenced.

As described above, according to the present embodiment, since the first measuring circuit 3 and the second measuring circuit 8 are provided on the sides of the demodulator 2 and the modulator 7, respectively, to determine the operation delay time, the timing of the codec processing can be found in a self-completing manner, so that the communication apparatus is capable of flexibly adapting to changes of specifications of the demodulator 2 and the modulator 7. When there are no changes of the specifications but the operation delay time is changed due to a temperature characteristic or the like, the communication apparatus is capable of flexibly adapting to such a change.

Obviously, many modifications and variations of the present invention are possible in light of the above teachings. It is therefore to be understood that within the scope of the appended claims, the invention may be practiced other than as specifically described.

What is claimed is:

1. A communication apparatus comprising:

timing means for generating a reference timing signal;

a demodulator which demodulates a received signal to output a demodulation signal;

codec means for performing codec of reception data outputted from the demodulator and codec of information to be transmitted;

a modulator which modulates an output of the codec means to output a modulation signal;

first measuring means which starts a counting in response to the reference timing signal and completes the counting in response to a demodulated signal from the demodulator;

counter means which starts a counting in response to the reference timing signal;

first comparing means for comparing a count value of the counter, which started counting at the same time as the first measuring means, with a count value of the first measuring means to generate an output when the count value of the counter exceeds the count value of the first measuring means;

delay means for substantially delaying a timing of a processing of the demodulated signal according to an output of the first comparing means in reception;

second measuring means which starts a counting in response to the reference timing signal and completes the counting in response to a modulated signal from the modulator;

second comparing means for comparing a count value of the counter, which started counting at the same time as the second measuring means, with a count value of the second measuring means to generate an output when the count value of the counter exceeds the count value of the second measuring means;

leading means for substantially leading a timing of a processing of the modulated signal according to an output of the second comparing means in transmission.

2. A communication apparatus comprising:

timing means for generating a reference timing signal;

a demodulator which demodulates a received signal to output a demodulation signal;

codec means for performing codec of reception data outputted from the demodulator and codec of information to be transmitted;

measuring means which starts a counting in response to the reference timing signal and completes the counting in response to a demodulated signal from the demodulator;

counter means which starts a counting in response to the reference timing signal;

comparing means for comparing a count value of the counter with a count value of the measuring means to generate an output when the count value of the counter exceeds the count value of the measuring means;

delay means for substantially delaying a timing of a processing of the demodulated signal according to an output of the comparing means in reception.

* * * * *